United States Patent [19]

Kim

[11] 4,416,551

[45] Nov. 22, 1983

[54] BATTERY MICROCALORIMETER

[75] Inventor: Kwang-Yil Kim, Bloomington, Minn.

[73] Assignee: Honeywell Inc., Minneapolis, Minn.

[21] Appl. No.: 300,878

[22] Filed: Sep. 11, 1981

[51] Int. Cl.³ .............................................. G01K 17/00
[52] U.S. Cl. ...................................................... 374/31
[58] Field of Search ....................................... 374/10–12, 374/31, 33, 34; 436/147; 422/51

[56] References Cited

U.S. PATENT DOCUMENTS

| 3,059,471 | 10/1962 | Calvet | 374/10 |
| 3,670,570 | 6/1972 | Briones | 374/32 |
| 3,813,937 | 6/1974 | Fletcher | 374/33 |
| 3,877,877 | 4/1975 | Prosen | 422/51 |

OTHER PUBLICATIONS

Evans et al. "A Microcalorimeter Using Semiconductors as the Sensing Elements" in *Chemical Instrumentation* vol. 2(2), pp. 249-255, 10/69.

Evans et al. "A Microcalorimeter Especially Suited for the Study of Small Quantities of Materials," in *Analytical Chem.* vol. 40, 1/68, pp. 262-264.

*Primary Examiner*—Herbert Goldstein
*Attorney, Agent, or Firm*—George W. Field

[57] ABSTRACT

A battery microcalorimeter comprising a thin sample container, a pair of heat sinks having faces apposed to the faces of the container, and a pair of thermopiles having first faces thermally engaging the faces of the container and second faces thermally engaging the faces of the heat sinks. The container is divided into separate chambers, one receiving the non-liquid elements of the battery cell, and the other receiving a heater with electrolyte. By tilting the container electrolyte is transferred between the chambers.

3 Claims, 6 Drawing Figures

BATTERY MICROCALORIMETER

TECHNICAL FIELD

This invention relates to the field of electrochemical engineering, and particularly to apparatus for determining the heat generated internally in batteries such as lithium thionyl chloride batteries under load.

BACKGROUND OF THE INVENTION

The amount of heat generated in an electrochemical cell during the discharge process may affect cell performance, and if excessive may result in serious hazards. To achieve the desired cell performance and maintain safe operation, an understanding of thermal behavior is important with regard to the rates of discharge and non-electrochemical reaction heats. Therefore it is desirable to measure the total internal heat during battery operation. A sensitive and precise calorimeter capable of measuring a very small amount of heat is essential to accurately quantify the thermal behavior of battery operation.

SUMMARY OF THE INVENTION

The invention comprises a calorimetric cell arranged to serve both as a reaction vessel and as a galvanic cell. An electrical calibration heater is incorporated in the cell, so that a separate reference cell is not necessary. The heater is capable of simulating the thermal behavior of cell discharge, which facilitates the calculation of generated heat.

Various advantages and features of novelty which characterize the invention are pointed out with particularity in the claims annexed hereto and forming a part hereof. However, for a better understanding of the invention, its advantages, and objects obtained by its use, reference should be had to the drawing which forms a further part hereof, and to accompanying descriptive matter, in which there is illustrated and described a preferred embodiment of the invention.

BRIEF DESCRIPTION OF THE DRAWING

In the drawing, in which like reference numerals indicate corresponding parts throughout the several views.

DESCRIPTION OF THE PREFERRED EMBODIMENT

Figure 6:
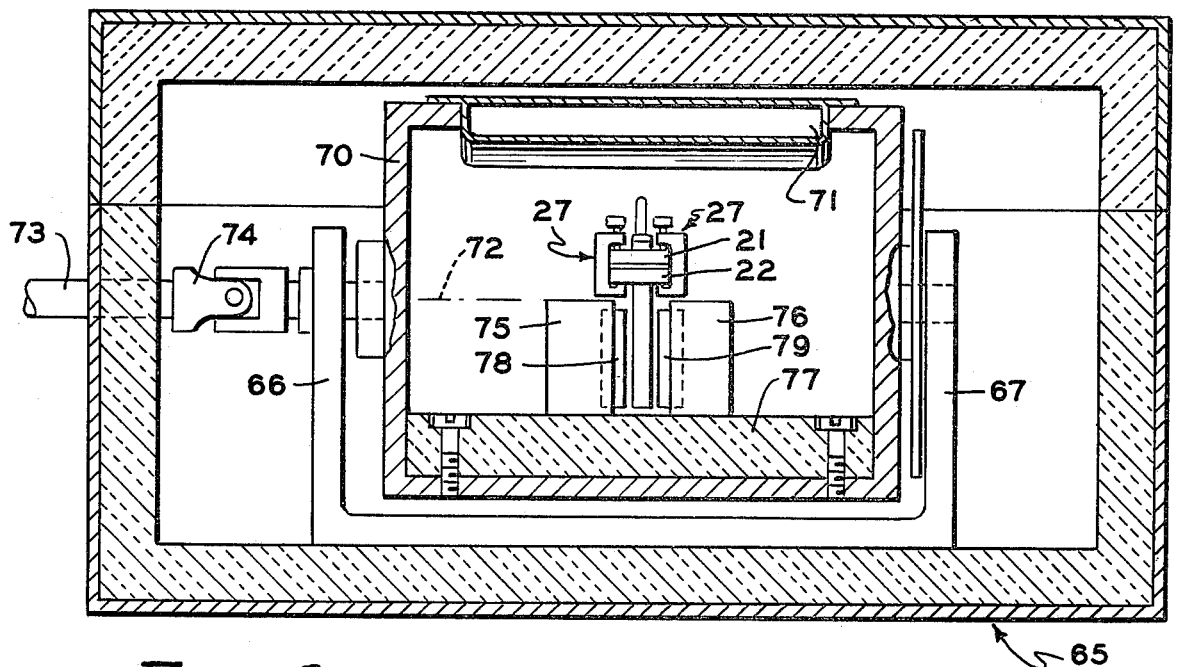
FIG. 6 is a view to a smaller scale of the cell installed for use in a calorimeter.
Figure 1:
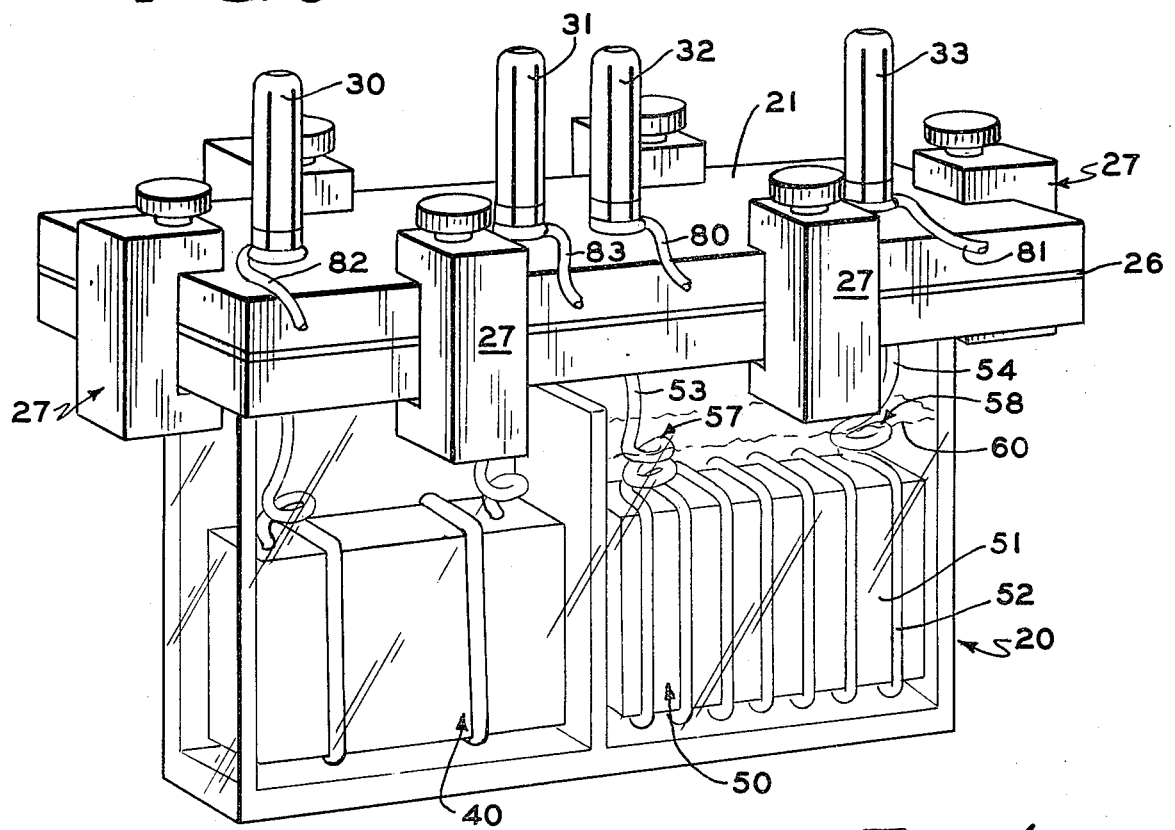
FIG. 1 is a view in perspective of a calorimeter cell according to the invention.
Figure 2:
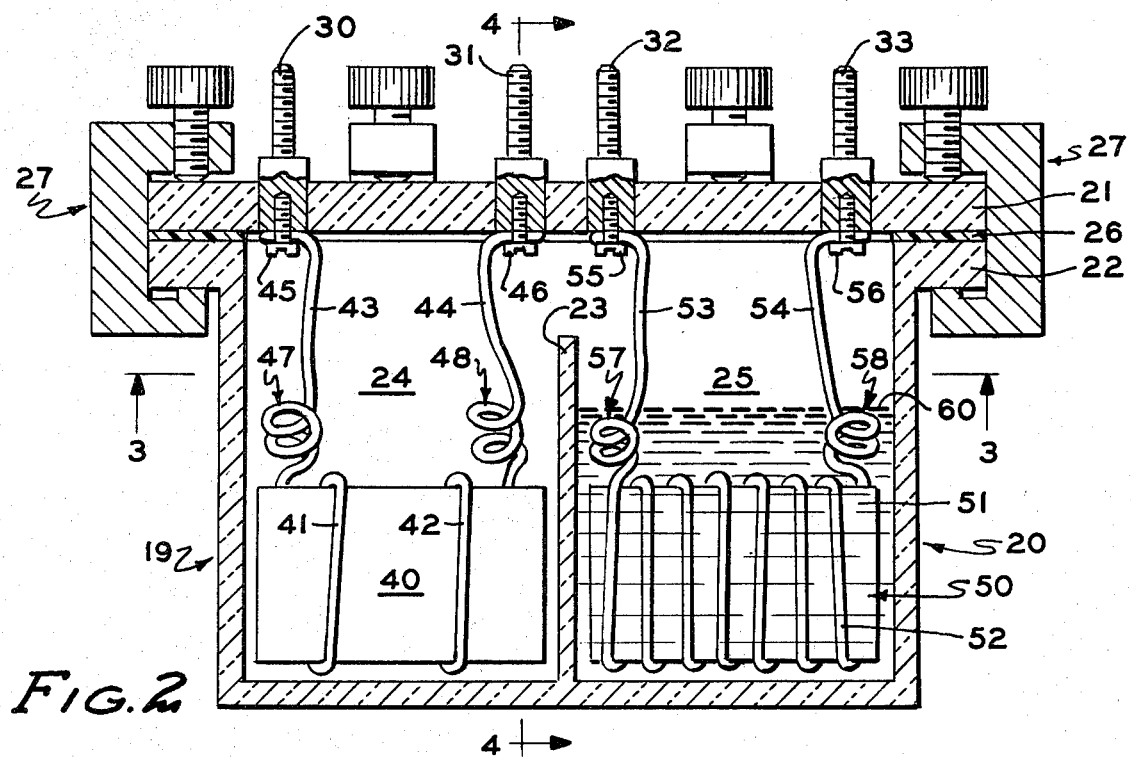
FIG. 2 is a view of the cell in central vertical section, to a smaller scale.
Figure 3:
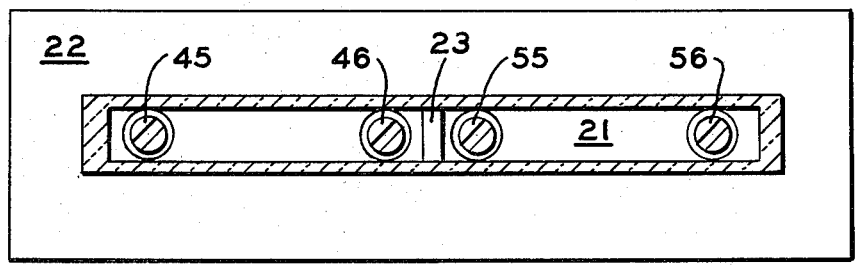
FIG. 3 is a fragmentary sectional view of the cell generally along the line 3—3 of FIG. 2.
Figure 5:
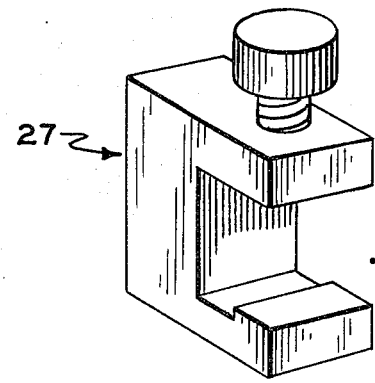
FIG. 5 shows a C-clamp.
Figure 4:
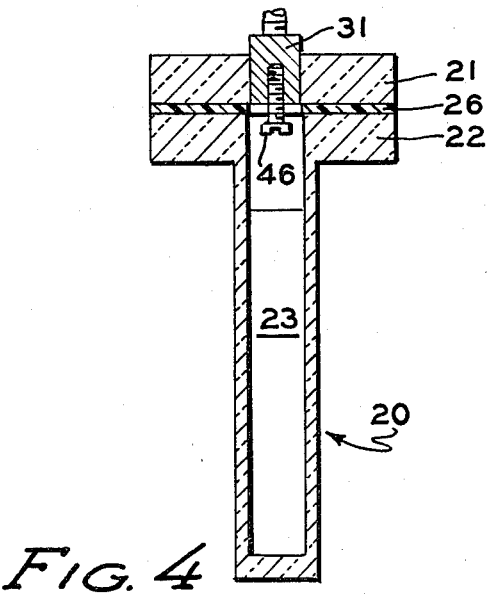
FIG. 4 is a fragmentary sectional view of the cell generally along the line 4—4 of FIG. 2.

A cell 19 according to the invention is shown to comprise a thin, elongated container 20 of material inert to battery chemicals, and a removable cover or lid 21 of similar material. The container has a flange 22 surrounding its upper opening, and a central partition 23 extends part way up the container to divide it into a pair of identical chambers 24 and 25. A gasket 26 is positioned between the container and the lid, which may be secured in place by a plurality of C-clamps 27.

Cover 21 includes a set of terminals to enable making of connections within the container. Thus terminals 30 and 31 are located over chamber 24 and terminals 32 and 33 are located over chamber 25.

Chamber 24 is configured to receive the electrodes and other nonliquid components 40 of a battery cell to be tested, the components being secured together by strapping wires 41 and 42 covered with teflon. The electrodes are connected to terminals 30 and 31 by conductors 43 and 44 and set screws 45 and 46, and the conductors are formed with helices 47 and 48 of a few turns near the battery components.

Chamber 25 contains a heater 50 of geometry close to that of a battery cell: a teflon plate 51 is wound with teflon covered resistance wire 52, the ends of which are connected to terminals 32 and 33 by conductors 53, 54 and set screws 55 and 56: the conductors have helices 57 and 58. Initially the electrolyte 60 for the battery is contained in chamber 25 to surround heater 50 and helices 57 and 58.

FIG. 6 shows the device in use. A closed calorimetric chamber 65 having walls of heat insulating material is provided with gudgeons 66, 67 in which a drum 70 having a door 71 is mounted for pivoting about an axis 72. Means including a shaft 73 and a universal joint 74 are provided for causing pivotal movement of the drum from without the chamber. A pair of metallic heat sink blocks 75 and 76 are mounted on a base 77 in drum 70, and container 20 is positioned so that a pair of thermopiles 78 and 79 engage the broad surfaces of the container and the adjacent surfaces of blocks 75 and 76. Heat generated in either chamber 24 or chamber 25 is accordingly conducted through the thermopiles to the heat sinks, and the thermopile outputs, on suitable conductors not shown, are representative of the heat generated.

Heat loss by conduction through wires 47, 48, 57, 58 is minimized by maintaining the helices under the surface of the electrolyte. The amount of heat generated by battery cell can be precisely determined by the calibration using the heater.

OPERATION

In use the non-liquid components of an electrochemical cell or battery cell are assembled as suggested at 40, placed in chamber 24, and connected to terminals 30 and 31. Heater 50 is placed in chamber 25 and connected to terminals 32 and 33, and a suitable quantity of the desired electrolyte 60 is added to chamber 25. Cover 21 is assembled to container 20 and clamped, so that battery components 20 are in chamber 24 and heater 50 is in chamber 25, the electrolyte 60 rising to cover the heater and helices 57 and 58 which occupy generally the same volume as battery components 40 and helices 47 and 48. Circuitry is arranged for supplying heater current to heater 50 on conductors 80 and 81 when desired, and for applying a load to battery components 40 on conductors 82 and 83, as well as for giving external indication of thermopile output.

The cell is now inserted in drum 70, with thermopiles 78 and 79 contacting the faces of the cell and the apposed faces of heat sinks 75 and 76. Door 71 is now fastened, chamber 65 is closed, and the entire assembly is allowed to reach a stable temperature.

It is now possible, by appropriate energization of heater 50, to generate heat in chamber 25 at any selected rate and observe its detection by suitable instrumentation connected to thermopiles 78 and 79. Calibration curves of thermopile output for the temperature differences may be plotted against time, the apparatus being allowed to return to a stable initial temperature before each plot is begun. The thermal masses of block 75 and 76 are so great that their temperature is practically constant during the plotting of any individual curve.

Next shaft 73 is turned, to pivot drum 70 about axis 72 so as to lower chamber 24 and raise chamber 25, until the electrolyte flows from chamber 25 to chamber 24, covering battery components 40 and helices 47 and 48, and the cell is restored to level position. The chamber volumes are identical, the heater volume is made close to that of the battery components, and the volume and thermal characteristics of the electrolyte are unchanged, so that calibration curves are meaningful as applied to chamber 24. When a selected load is applied to the now operative battery cell, the relationship of the resulting thermopile outputs to those previously recorded is a readily interpretable indication of the heat generated internally in the battery cell in response to the load thereon.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. In a calorimeter:
    (a) a thin sample container having opposite faces of large area with respect to the thickness of the container, cover means for closing said container in liquid-tight relation, and terminal means carried by said cover means for making electrical connections therethrough, said container being separated by a narrow partition extending between said faces into first and second narrow chambers having surfaces which make up the faces of said container, said partition being of less height than said container;
    (b) a pair of heat sinks having faces apposed to the faces of said container;
    (c) a pair of thermopiles having first faces thermally engaging said faces of said container, and second faces thermally engaging said faces of said heat sinks, whereby to conduct heat from said container to said sink and give electrical outputs determined by the flow of said heat; and
    (d) the nonliquid components of an electrochemical cell mounted in one of said chambers connected to said terminal means.

2. Apparatus according to claim 1, together with a charge of battery electrolyte in one of said chambers, and the nonliquid components of a battery cell in the other said chamber and connected to said terminal means.

3. Apparatus according to claim 2 and an electric heater in said one of said chambers and connected to said terminal means independently of said nonliquid components.

* * * * *